US012772973B2

(12) United States Patent

Lafond et al.

(10) Patent No.: US 12,772,973 B2

(45) Date of Patent: Oct. 27, 2026

(54) AUTOMATED FOOD DISPENSING LURE FOR LARGE GAME, OR SIMILAR

(71) Applicants: Martin Lafond, Rockland (CA); Alain Lafond, Verner (CA)

(72) Inventors: Martin Lafond, Rockland (CA); Alain Lafond, Verner (CA)

( * ) Notice: Subject to any disclaimer, the term of this patent is extended or adjusted under 35 U.S.C. 154(b) by 0 days.

(21) Appl. No.: 18/746,117

(22) Filed: Jun. 18, 2024

(65) Prior Publication Data

US 2025/0008944 A1 Jan. 9, 2025

(51) Int. Cl.
*A01M 31/00* (2006.01)
*A01K 5/02* (2006.01)

(52) U.S. Cl.
CPC ......... *A01M 31/008* (2013.01); *A01K 5/0291* (2013.01)

(58) Field of Classification Search
CPC .................................................... A01K 5/0291
See application file for complete search history.

(56) References Cited

U.S. PATENT DOCUMENTS 554,779 A * 2/1896 Hodgson .............. A01K 5/0291 119/51.14
1,022,309 A * 4/1912 Elliott .................. A01K 5/0291 119/51.12
2,585,371 A * 2/1952 Coffing ................ A01K 5/0291 119/51.13
3,587,530 A * 6/1971 Blair .................... A01K 5/0291 119/51.11
3,678,902 A * 7/1972 Ruth .................... A01K 5/0291 119/51.11
4,688,520 A * 8/1987 Parks ................... A01K 5/0275 119/51.5
5,345,893 A * 9/1994 Morris ................. A01K 5/0291 119/51.11
10,070,619 B2 * 9/2018 Priefert ................ A01K 5/0291
10,201,150 B1 * 2/2019 Cottle .................. A01K 5/0291
10,398,128 B2 * 9/2019 Green .................. A01K 5/0275
10,517,268 B2 * 12/2019 Priefert ................ A01K 5/0225
11,284,602 B2 * 3/2022 Griswold ............. A01K 5/0225
2004/0216681 A1 * 11/2004 Lesher ................. A01K 5/0291 119/51.13

(Continued)

*Primary Examiner* — Jessica B Wong

(57) ABSTRACT

The invention relates to a game lure system designed for attracting large animals. The system comprises a durable and waterproof container divided by a partition into a food storage compartment and a main compartment. A hatch on the container is programmably controlled to open at pre-set times, allowing food to be accessed from the food storage to the main compartment. The timing and duration of the hatch's opening are controlled by a programmable control unit, which also activates a sound-producing device when the hatch opens, enhancing the lure's effectiveness by associating the sound with food availability. This programmable feature allows for the creation of a predictable feeding pattern, thereby habituating the targeted animals to the lure's location. The lure is also equipped with mounting brackets for easy installation and a top lid for maintenance and refilling. This invention provides an efficient and automated solution to attract large game with increased predictability and effectiveness.

14 Claims, 5 Drawing Sheets

(56) References Cited

U.S. PATENT DOCUMENTS

| | | | | |
|---|---|---|---|---|
| 2005/0284383 | A1* | 12/2005 | Fehringer | A01K 5/0291 119/51.13 |
| 2007/0000445 | A1* | 1/2007 | Blais | A01K 5/0275 119/56.1 |
| 2007/0107667 | A1* | 5/2007 | Morris | A01K 1/033 119/482 |
| 2007/0181513 | A1* | 8/2007 | Ward | A47F 1/04 211/59.2 |
| 2008/0029034 | A1* | 2/2008 | Busbice | A01K 5/025 119/51.11 |
| 2009/0064938 | A1* | 3/2009 | Or | A01K 5/0291 119/51.5 |
| 2013/0180456 | A1* | 7/2013 | Whitsett | A01K 5/02 119/57.92 |
| 2015/0181801 | A1* | 7/2015 | Niemela | A01C 17/001 119/51.01 |
| 2015/0313179 | A1* | 11/2015 | Green | A01K 5/0291 119/51.11 |
| 2016/0088817 | A1* | 3/2016 | Priefert | A01K 5/0225 119/51.12 |
| 2017/0360002 | A1* | 12/2017 | Bellow | A01K 5/0291 |
| 2018/0288967 | A1* | 10/2018 | Gagnon | A01K 5/01 |
| 2019/0000037 | A1* | 1/2019 | Priefert | A01K 5/0225 |
| 2019/0116779 | A1* | 4/2019 | Poché | A01M 29/24 |
| 2019/0373852 | A1* | 12/2019 | Figgins | A01K 7/04 |
| 2020/0178500 | A1* | 6/2020 | Winn | A01K 5/02 |
| 2020/0275634 | A1* | 9/2020 | Griswold | A01K 5/0225 |
| 2022/0211001 | A1* | 7/2022 | Schlotthauer | A01K 5/0275 |
| 2023/0032312 | A1* | 2/2023 | Smith | A01K 5/0275 |
| 2023/0255178 | A1* | 8/2023 | Niese | A01K 5/0291 119/51.12 |
| 2024/0237611 | A1* | 7/2024 | Brooks | A01K 11/006 |
| 2025/0008944 | A1* | 1/2025 | Lafond | A01M 31/008 |

* cited by examiner

AUTOMATED FOOD DISPENSING LURE FOR LARGE GAME, OR SIMILAR

CROSS-REFERENCE TO RELATED APPLICATIONS

The present invention claims priority to UK application number GB2310351.8, filed on Jul. 6, 2023, the disclosure of which is hereby incorporated in its entirety at least by reference.

BACKGROUND OF THE INVENTION

1. Field of the Invention

The present invention relates generally to sport hunting but more particularly to a lure for large game.

2. Description of Related Art

Lures designed for attracting large game are a staple in wildlife management and hunting industries. Despite their widespread use, existing lures often lack sophisticated mechanisms for controlled and automated food dispensing, which limits their effectiveness and practicality. Traditional lures typically require manual intervention to replenish food supplies and do not offer features that regulate the timing of food availability or provide auditory alerts to better train and habituate animals. Consequently, there is a significant need for innovations in this field that incorporate automated food dispensing with programmable timing and sensory alerts, thereby increasing the predictability and efficiency of attracting large game

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

An objective of the present invention is to provide a highly effective and user-friendly lure for large game that automates the process of attracting animals through controlled food dispensation and sound emissions.

In order to do so, a lure for large game is provided, comprising a container with a partition that is configured to divide the container into a food storage compartment and a main compartment; a hatch on the container that is configured to open according to a pre-programmed schedule to allow access to food in the main compartment from the food storage compartment; and, a programmable control unit that controls the opening and closing of the hatch based on the pre-programmed schedule.

In one embodiment, the container is box shaped with six faces and is constructed from a durable and waterproof material. In one embodiment, the partition within the container is movable and is configured to dispense food from the food storage compartment to the main compartment. In another embodiment, the movable partition is actuated by a motor assembly selected from the group consisting of a worm screw motor and a linear actuator. In one embodiment, the control unit is further configured to activate a sound-producing device when the hatch opens. In yet another embodiment, the programmable control unit comprises a printed circuit board (PCB) which is programmable via software to select the timing and duration of the opening and closing of the hatch and partition. In another embodiment, the sound-producing device is a speaker that is integrated into the container and connected to the PCB. In one embodiment, a power source located within the container is provided, wherein the power source provides electrical power to the programmable control unit, a hatch motor assembly configured to actuate the hatch, and the sound-producing device. In one embodiment, the hatch is configured to open for a short duration to limit access by non-target animals. In one embodiment, mounting brackets on a backside of the container are provided for attaching the container to a support structure. In one embodiment, the support structure is a tree. In one embodiment, the container includes a top lid for accessing internal components for maintenance and refilling the food storage compartment.

The foregoing has outlined rather broadly the more pertinent and important features of the present disclosure so that the detailed description of the invention that follows may be better understood and so that the present contribution to the art can be more fully appreciated. Additional features of the invention, which will be described hereinafter, form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

As used herein, the phrase "short duration" in the context of the hatch opening refers to a predetermined period of time, programmable via the control unit, that is sufficient to allow a target animal, such as a large game animal, to access the dispensed food, while being brief enough to minimize or prevent access by non-target, smaller, or quicker animals such as squirrels or rodents. This duration is strategically selected to enhance the lure's effectiveness for the intended species. The lure's operation involves a two-stage dispensing process: first, the movable partition is actively actuated by its motor assembly to transfer a predetermined quantity of food from the food storage compartment into the main compartment. Second, after this transfer is complete, the hatch is actuated to open, providing the target animal with access to the food now waiting in the main compartment. The programmable control unit coordinates this sequence.

BRIEF DESCRIPTION OF THE DRAWINGS

Other features and advantages of the present invention will become apparent when the following detailed description is read in conjunction with the accompanying drawings, in which.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a lure for large game.

It is to be understood that the terminology used herein is for the purpose of describing particular embodiments only and is not intended to be limiting. The terms "a" or "an," as used herein, are defined as to mean "at least one." The term "plurality," as used herein, is defined as two or more. The term "another," as used herein, is defined as at least a second or more. The terms "including" and/or "having," as used herein, are defined as comprising (i.e., open language). The term "providing" is defined herein in its broadest sense, e.g., bringing/coming into physical existence, making available, and/or supplying to someone or something, in whole or in multiple parts at once or over a period of time. These terms generally refer to a range of numbers that one of skill in the art would consider equivalent to the recited values (i.e., having the same function or result). In many instances these terms may include numbers that are rounded to the nearest significant figure.

Figure 1B:
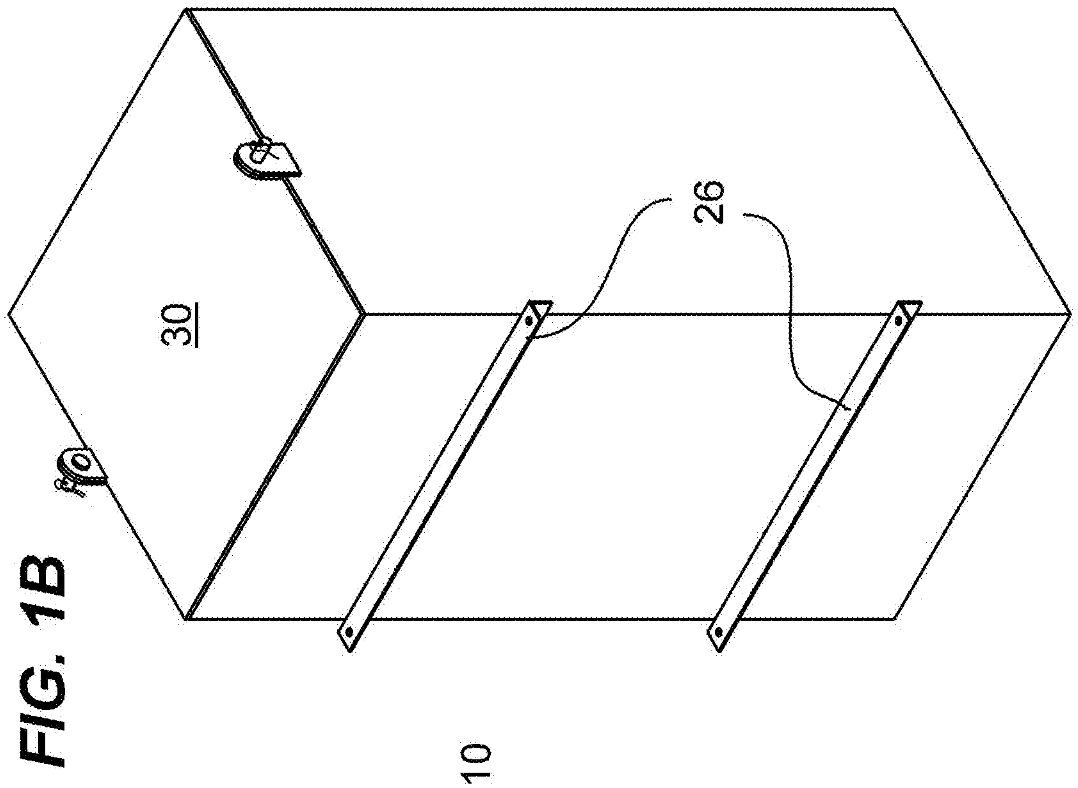
FIGS. 1A-B illustrate top front and top rear isometric views respectively of the lure according to an embodiment of the present invention.
Figure 1A:
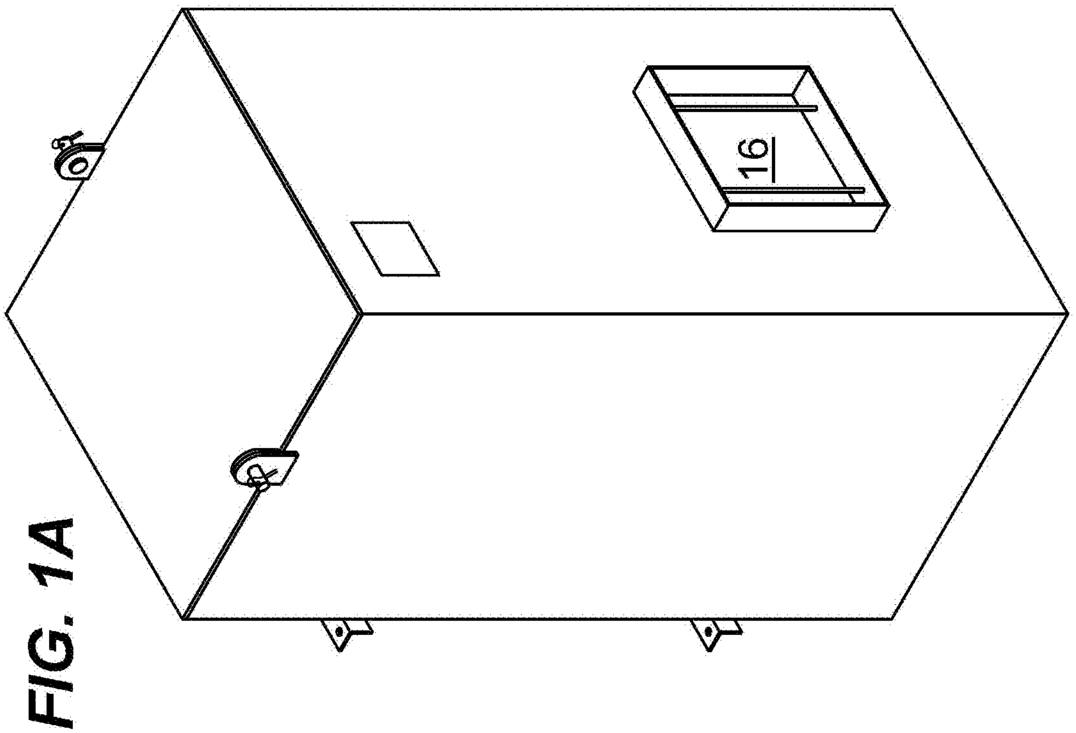
Figure 2C:
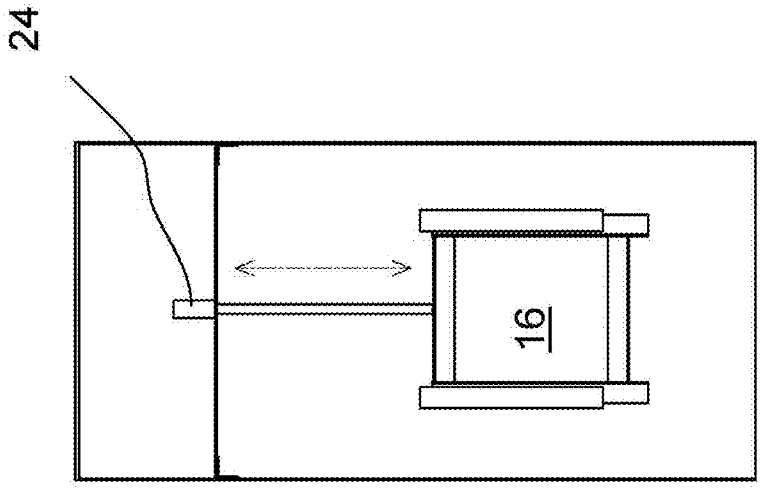
FIGS. 2A-C are side and cutaway side views of the lure showing the partition and the hatch mechanism according to an embodiment of the present invention.
Figure 2B:
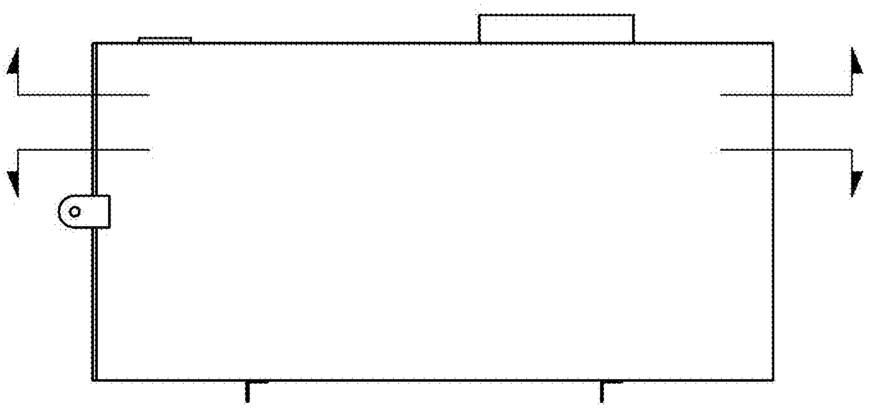
Figure 2A:
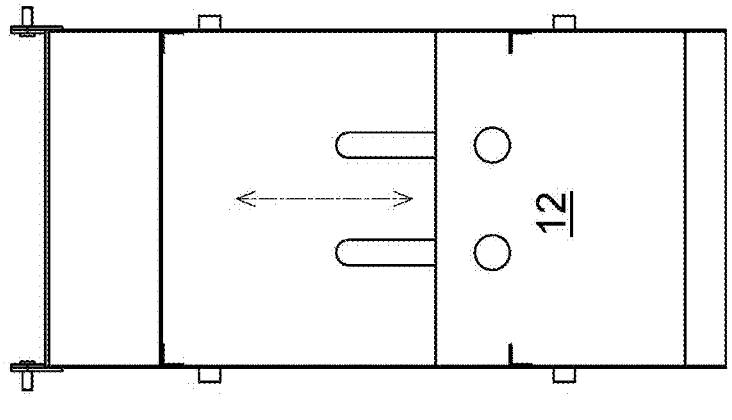
Figure 3B:
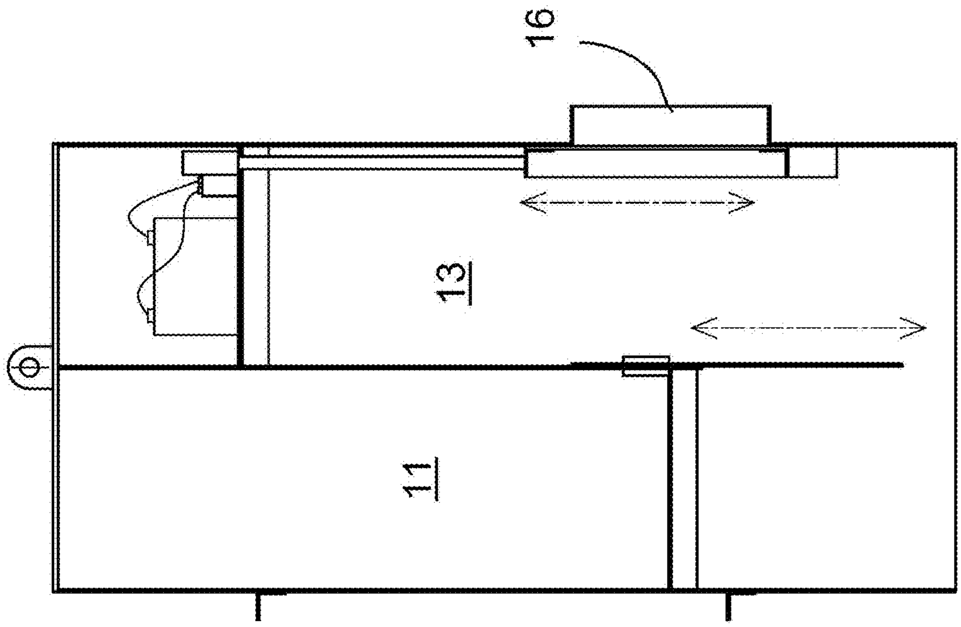
FIGS. 3A-B are side and cutaway side views of the lure showing compartments and the hatch according to an embodiment of the present invention.
Figure 3A:
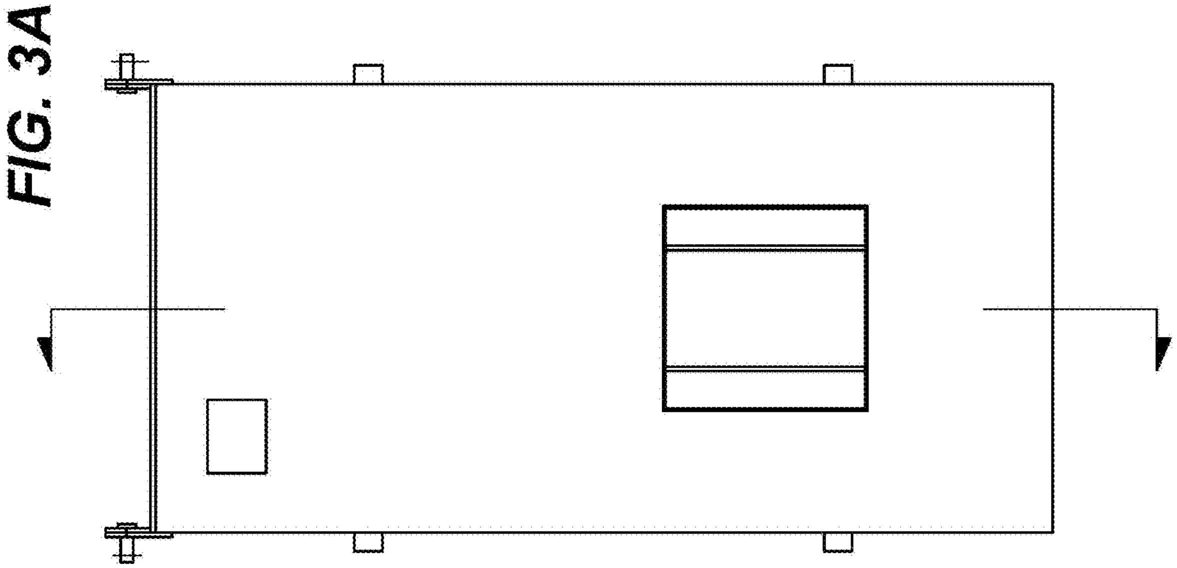
Figure 4:
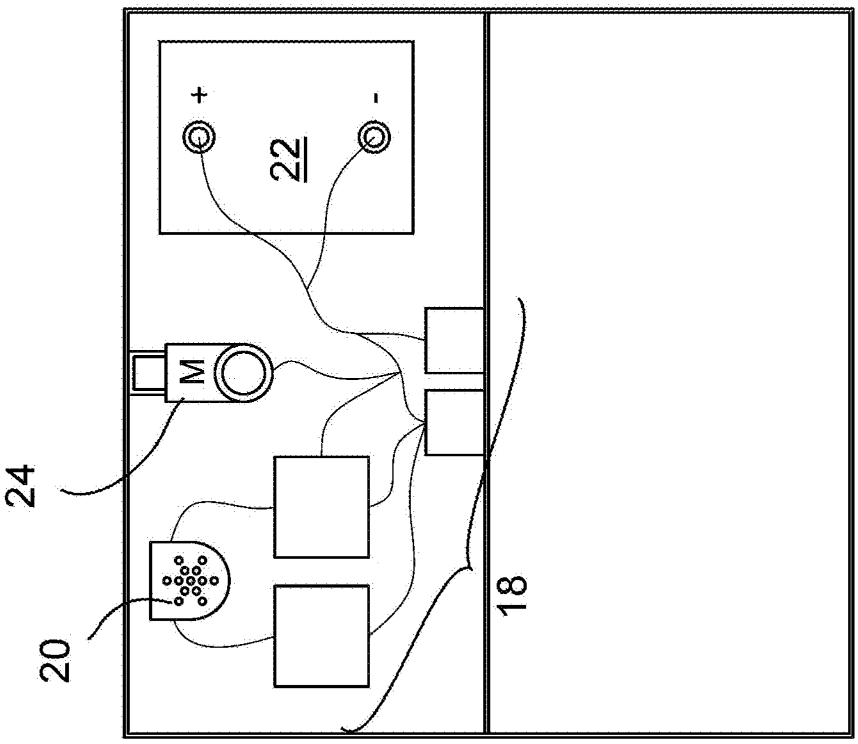
FIG. 4 is a top view of the lure showing the interior electronics according to an embodiment of the present invention.
Figure 5B:
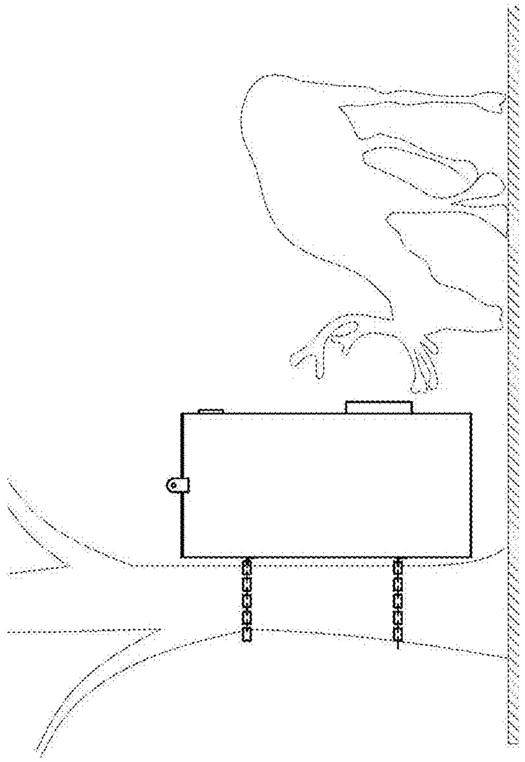
FIGS. 5A-B are side views showing the lure installed on a tree and in use according to an embodiment of the present invention.
Figure 5A:
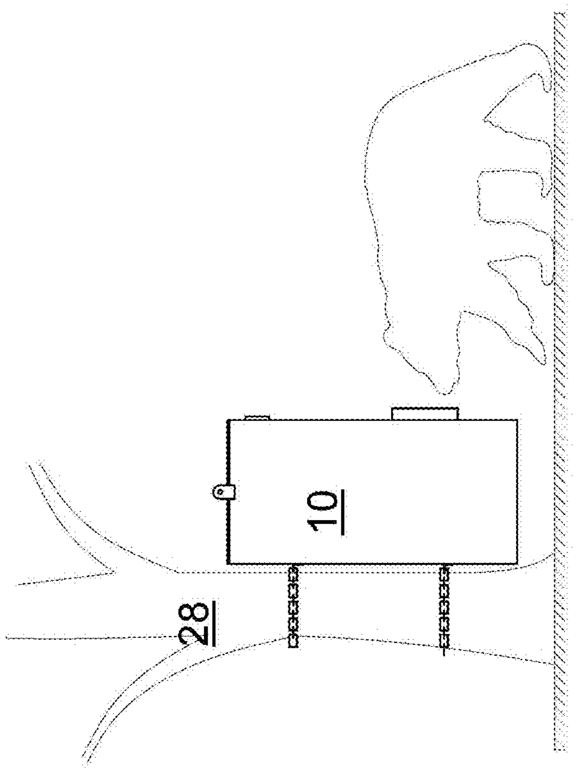

Referring now to the accompanying FIGS. 1A through 5B, the present invention describes a lure, specifically designed for attracting large game. In some embodiments, the lure comprises a box-like container 10 constructed with six faces from a material that is both durable and waterproof, making it suitable for various environmental conditions.

Within the container 10, a food hopper compartment 11, includes a movable partition 12. Advantageously, the partition is designed to control the dispensation of food 14 into a main compartment 13. Activation of the partition 12 allows a predetermined quantity of food to transfer into the main compartment 13. Subsequently, a hatch 16 opens to permit access to the food by a targeted animal, thereby facilitating controlled feeding sessions.

The operational mechanics of the hatch 16 are controlled by a programmable control unit, more specifically by a printed circuit board (PCB) 18, which is responsible for both opening and closing of the hatch. The PCB 18 is powered by a battery 22, securely housed within the container 10, ensuring uninterrupted functionality. In some embodiments, the hatch 16 is linked to a hatch motor assembly 24, typically configured as a motor-actuated worm screw, although alternative configurations such as a linear actuator are considered within the scope of this invention. It should be noted that other configuration or assemblies for activating the hatch may be provided.

In some embodiments, the movable partition 12 is similarly actuated by a motor assembly, designed to provide reliable and repetitive movement. The PCB 18 is equipped with software that enables users to program specific schedules for the operation of both the partition 12 and the hatch 16, allowing the timing and duration of openings to be precisely controlled.

Programming these operations is crucial for habituating animals to the lure, as it establishes a predictable pattern of food availability. Additionally, in some embodiments, the lure 10 incorporates a speaker 20, also connected to the PCB 18. This speaker is activated when the hatch 16 opens, emitting a sound that further reinforces the behavioral conditioning of the animals, encouraging them to associate the sound with the availability of food and thus appear at consistent times.

A critical feature of the present invention is the limited duration during which the hatch 16 remains open, which significantly reduces the risk of food theft by non-target species such as squirrels and other rodents.

During use, the container's backside is fitted with mounting brackets 26, allowing for secure attachment to a tree 28 or other suitable structures. In some embodiments, a top lid 30 provides convenient access for maintenance tasks related to the PCB 18 and for refilling the food hopper compartment 11 with food 14.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. In other words, the terminology and phraseology used in this description and the abstract are for illustrative purposes and should not be considered limiting. Therefore, while exemplary illustrative embodiments of the invention have been described, numerous variations and alternative embodiments will occur to those skilled in the art. Such variations and alternative embodiments are contemplated, and can be made without departing from the spirit and scope of the invention.

It should further be noted that throughout the entire disclosure, the labels such as left, right, front, back, top, bottom, forward, reverse, clockwise, counterclockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, references to "first," "second," "third," and so fourth members throughout the disclosure (and in particular, claims) are not used to show a serial or numerical limitation but instead are used to distinguish or identify the various members of the group.

What is claimed is:

1. A lure for large game comprising:

a container defining an interior space, the container comprising:

a top lid;

a food storage compartment configured to hold a bulk supply of food positioned fully within the interior space and under the top lid;

a main compartment positioned fully within the interior space and under the top lid;

a movable partition positioned between the food storage compartment and the main compartment;

a hatch configured to selectively provide access to the main compartment from outside the container;

a motor assembly operably coupled to the movable partition; and a programmable control unit communicatively coupled to the motor assembly and the hatch, wherein the programmable control unit is configured to actuate the motor assembly to move the movable partition to transfer a predetermined quantity of food from the food storage compartment into the main compartment and after the transfer of the predetermined quantity of food, actuate the hatch to open to allow an animal to access the predetermined quantity of food located within the main compartment.

2. The lure of claim 1, wherein the container is box shaped with six faces and is constructed from a durable and waterproof material.

3. The lure of claim 1, wherein the movable partition is actuated by the motor assembly selected from the group consisting of a worm screw motor and a linear actuator.

4. The lure of claim 1, wherein the programmable control unit is configured to activate a sound-producing device in response to actuation of the hatch.

5. The lure of claim 4, wherein the programmable control unit comprises a printed circuit board (PCB) which is programmable via software to select the timing and duration of the opening and closing of the hatch and partition.

6. The lure of claim 4, wherein the sound-producing device is a speaker that is electrically connected to the programmable control unit.

7. The lure of claim 4, further comprising a power source located within the container that provides electrical power to the programmable control unit, a hatch motor assembly configured to actuate the hatch, and the sound-producing device.

8. The lure of claim 1, wherein the programmable control unit is configured to cause the hatch to open for a predetermined duration sufficient to allow access by a target animal while limiting access by non-target animals.

9. The lure of claim 1, further comprising mounting brackets on a backside of the container for attaching the container to a support structure.

10. The lure of claim 1, wherein the container includes a top lid for accessing internal components for maintenance and refilling the food storage compartment.

11. The lure of claim 4, wherein the sound-producing device is a speaker integrated into the container and electrically connected to the programmable control unit.

12. The lure of claim 4, wherein the programmable control unit comprises a printed circuit board (PCB) which is programmable via software to select the timing and duration of the opening and closing of the hatch and the actuation of the partition.

13. The lure of claim 1, wherein the movable partition is positioned on an internal wall that separates the food storage compartment and the main compartment and the internal wall is fully within the interior space.

14. The lure of claim 1, wherein the food storage compartment and the main compartment are approximately equal in size.

* * * * *